United States Patent [19]

Jeschke et al.

[11] Patent Number: 4,760,047

[45] Date of Patent: Jul. 26, 1988

[54] CATALYST BLOCK

[75] Inventors: Peter Jeschke, Walluf; Hartmut Kainer; Blagoje Levkov, both of Wiesbaden, all of Fed. Rep. of Germany

[73] Assignee: Didier-Werke AG, Wiesbaden, Fed. Rep. of Germany

[21] Appl. No.: 36,443

[22] Filed: Apr. 9, 1987

[30] Foreign Application Priority Data

Apr. 28, 1986 [DE] Fed. Rep. of Germany ....... 3614347

[51] Int. Cl.$^4$ .......................... B01J 32/00; B01J 35/04
[52] U.S. Cl. ...................................... 502/439; 502/527
[58] Field of Search ................................ 502/439, 527

[56] References Cited

U.S. PATENT DOCUMENTS

| 4,282,115 | 8/1981 | Atsukawa et al. | 502/250 X |
| 4,446,250 | 5/1984 | Niwa et al. | 502/527 X |
| 4,455,281 | 6/1984 | Ishida et al. | 502/527 X |

FOREIGN PATENT DOCUMENTS

| 206067 | 12/1986 | European Pat. Off. | 502/527 |
| 3046921 | 2/1986 | Fed. Rep. of Germany. | |

*Primary Examiner*—W. J. Shine
*Attorney, Agent, or Firm*—Nils H. Ljungman

[57] ABSTRACT

A quadrangular catalyst block having a plurality of through-going slots separated by intermediate walls, each of the slots having first and second characterizing dimensions, with one of the characterizing dimensions being significantly greater than the other.

22 Claims, 6 Drawing Sheets

CATALYST BLOCK

BACKGROUND OF THE INVENTION

1. Field of the Invention

The present invention relates to a catalyst block penetrated by a number of parallel passages for effecting catalytic conversion reactions in an exhaust gas flowing through the passages.

2. Description of the Prior Art

Prior art catalyst blocks are normally provided with passages having a honeycombed cross section. The passages are generally distributed in several rows above one another. The manufacture of such catalyst blocks is expensive. In addition, the passages with a honeycomb cross section quickly become clogged, especially when the exhaust gases contain large quantities of dust, and as a result, the catalyst block becomes unusable. A further disadvantage of such known designs is that on account of the honeycomb shape and the rapid clogging of passages, there are significant pressure losses in the exhaust gas flowing through.

Catalyst blocks have also been proposed in which a number of catalyst plates are arranged in a frame. Assembly of the catalyst plates in such a frame represents an additional operational step. Examples of prior art relating to catalysts are found in German Pat. No. DE-PS 25 12 410 which corresponds to U.S. Pat. No. 4,087,250, entitled "Apparatus for Removing Nitric Oxides from Processing Exhaust Gases", U.S. Pat. No. 4,081,511, entitled "Process for Removing Nitric Oxides from Processing Exhaust Gases", and German Laid Open Patent Application No. DE-OS 25 12 409, all of which are incorporated by reference as if fully set forth herein.

OBJECTS OF THE INVENTION

One object of the present invention is the provision of an easily manufactured and assembled catalyst block.

Another object of the present invention is the provision of such a catalyst block which is provided with passages of large cross-sectional area.

A still further object of the present invention is the provision of such a catalyst block having throughgoing passages with a reduced tendency to clog.

SUMMARY OF THE INVENTION

These and other objects are achieved by the invention by means of a catalyst block of the type described above, wherein the outline of the block is rectangular, and all the passages are arranged in a single row, and the passages are designed as narrow slots, such that one dimension of the internal cross sectional dimensions of the slot, that is, either the slot width or slot height is significantly smaller than the other internal cross sectional dimensions thereof In the rectangular outline, the slots are in a row next to one another. The block with the slots can be easily manufactured, e.g., by extrusion. On account of the rectangular configuration, the blocks can be easily stacked and installed in a reactor.

Since one dimension of the slot, namely the slot width or the slot height, is significantly larger than the other dimension, namely the slot height or the slot width, respectively, the danger of clogging is significantly reduced.

The catalyst block of the invention exhibits a large open cross section with a large catalyst surface. Only small pressure losses are experienced.

In general, the invention features a catalyst block for effecting catalytic conversion reactions in an exhaust gas flowing therethrough. The catalyst block comprises a block having a quadrangular cross section and provided with a single row of a plurality of throughgoing slots separated by intermediate walls. Each of the slots has first and second characterizing dimensions. One of the first and second dimensions is substantially greater than the other of the first and second dimensions.

We now turn to a description of the preferred embodiments of the invention, after first briefly describing the drawings, wherein:

DESCRIPTION OF THE PREFERRED EMBODIMENTS

Referring now to the drawings, a rectangular catalyst block, for example, made of a ceramic material, has a length L, a height H and a width B. The block is penetrated by slots 1 with a slot height h and a slot width b. The slots 1 run in the block in a single row next to one another.

In the embodiments illustrated in FIGS. 1–4 and 6, the slot height h is significantly greater than the slot width b. In the embodiment illustrated in FIG. 5, the slot width b is significantly greater than the slot height h.

The length L is greater than the height H. The length L is preferably between about 1400 mm and about 3000 mm. The length of the catalyst block may be appropriately chosen such that, for an exhaust gas having a given dust content, a substantial amount of that dust content will settle out of the exhaust gas during passage through the catalyst block. The height H, in the embodiments illustrated in FIGS. 1–4 and 6, for example, is about 150 mm, and the slot width b is preferably between about 4 mm and about 20 mm.

The slots 1 are separated from one another by partitions 2, the thicknesses of which are preferably between about 0.6 mm and about 3 mm. A bottom wall 3 and a top wall 4, as well as side walls 5 are slightly thicker than partitions 2. When partitions 2 are about 1.4 mm thick, the thickness of walls 3, 4 and 5 is approximately 1.7 mm. Overall, an open cross section of the block (i.e., the total combined cross-sectional area of passages 1)

can be achieved which amounts to approximately 80% to 90% of the total cross section of the block.

Figure 1:
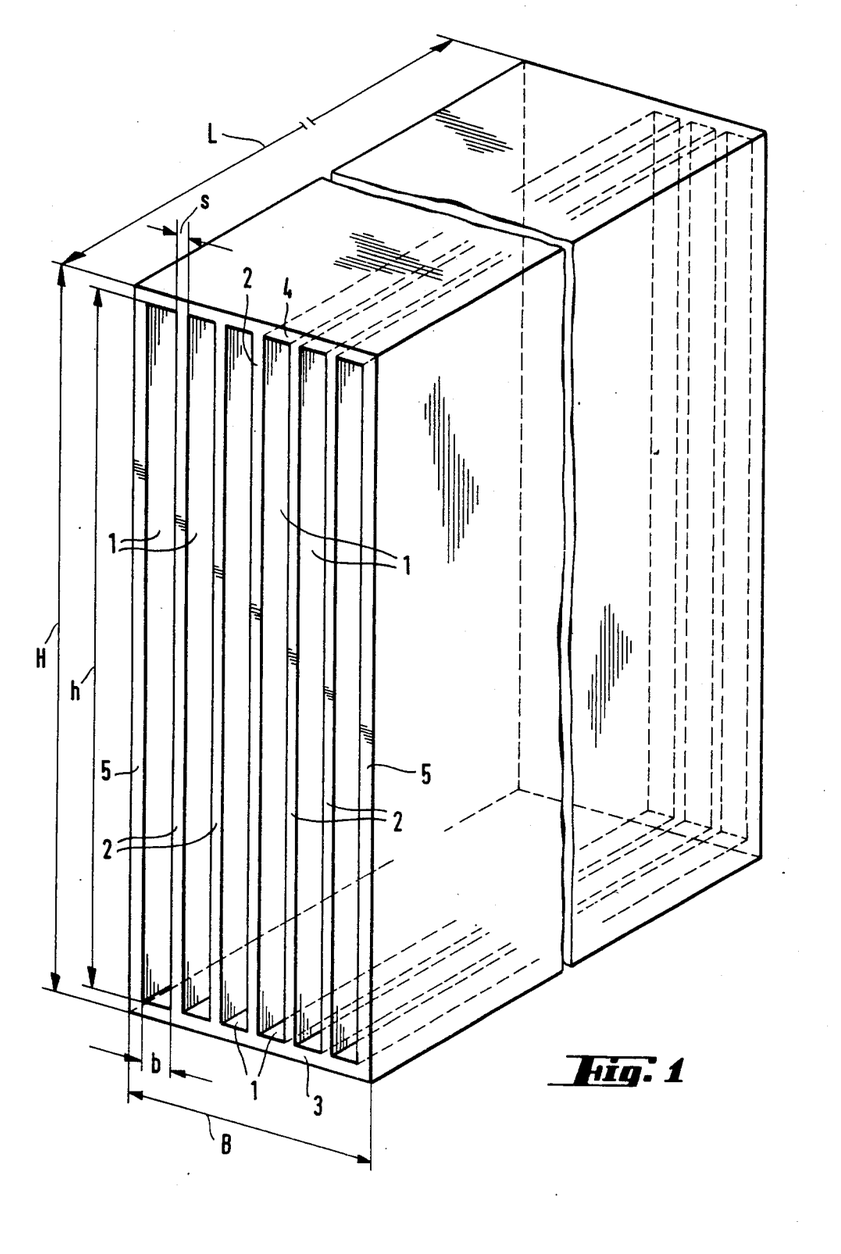
FIG. 1 is a perspective view of a catalyst block constructed according to the invention.

In the embodiment illustrated in FIG. 1, the block has a closed circumference. The slot width b, for example, is about 6 mm. The slot height h is in the ratio of approximately 25 to 1 to the slot width b.

Figure 2:
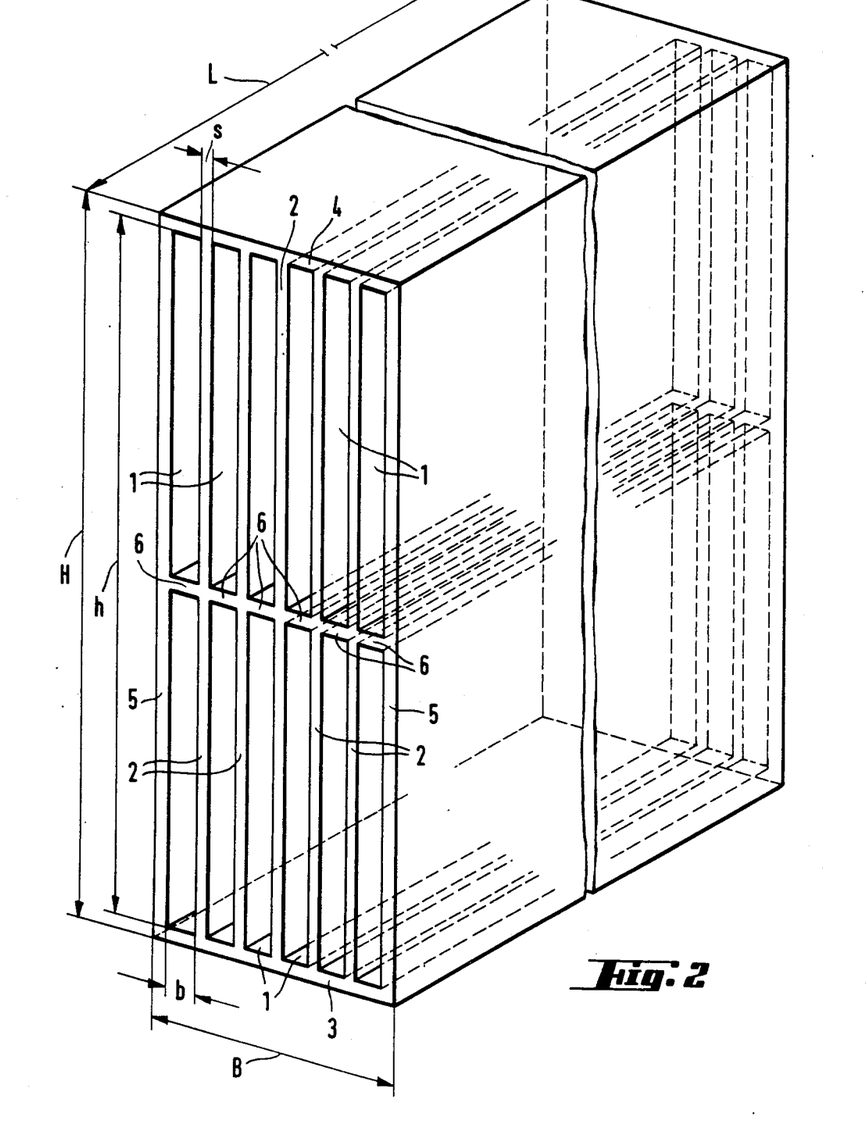
FIG. 2 is a perspective view of a catalyst block constructed according to the invention and having a transverse web.

In the embodiment illustrated in FIG. 2, transverse webs 6 extend into slot 1 and increase the stability of the block. The ratio of a slot height h to slot width b can thereby be increased.

Figure 3:
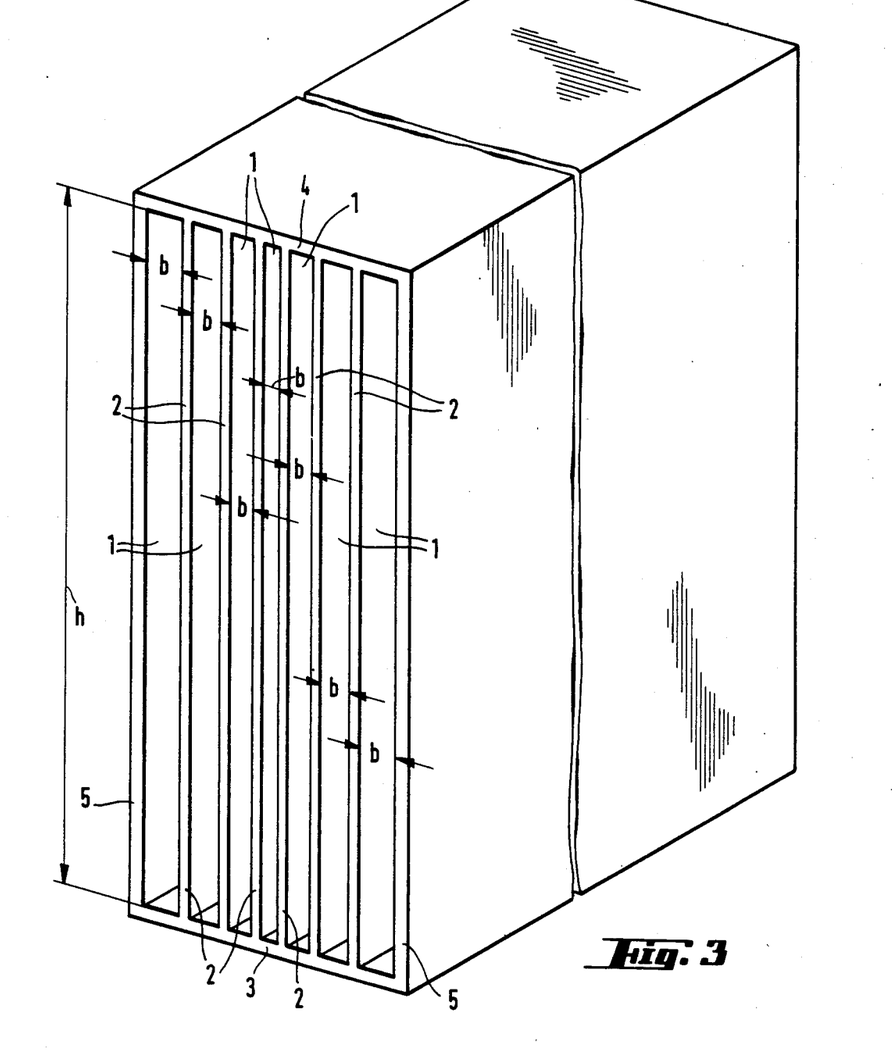
FIG. 3 is a perspective view of a catalyst block constructed according to the invention and having different slot widths.

In the embodiment illustrated in FIG. 3, the slot widths b vary. The narrowest slot 1 is in the center of the block, and the slot widths b increase moving from the center of the block.

Figure 4:
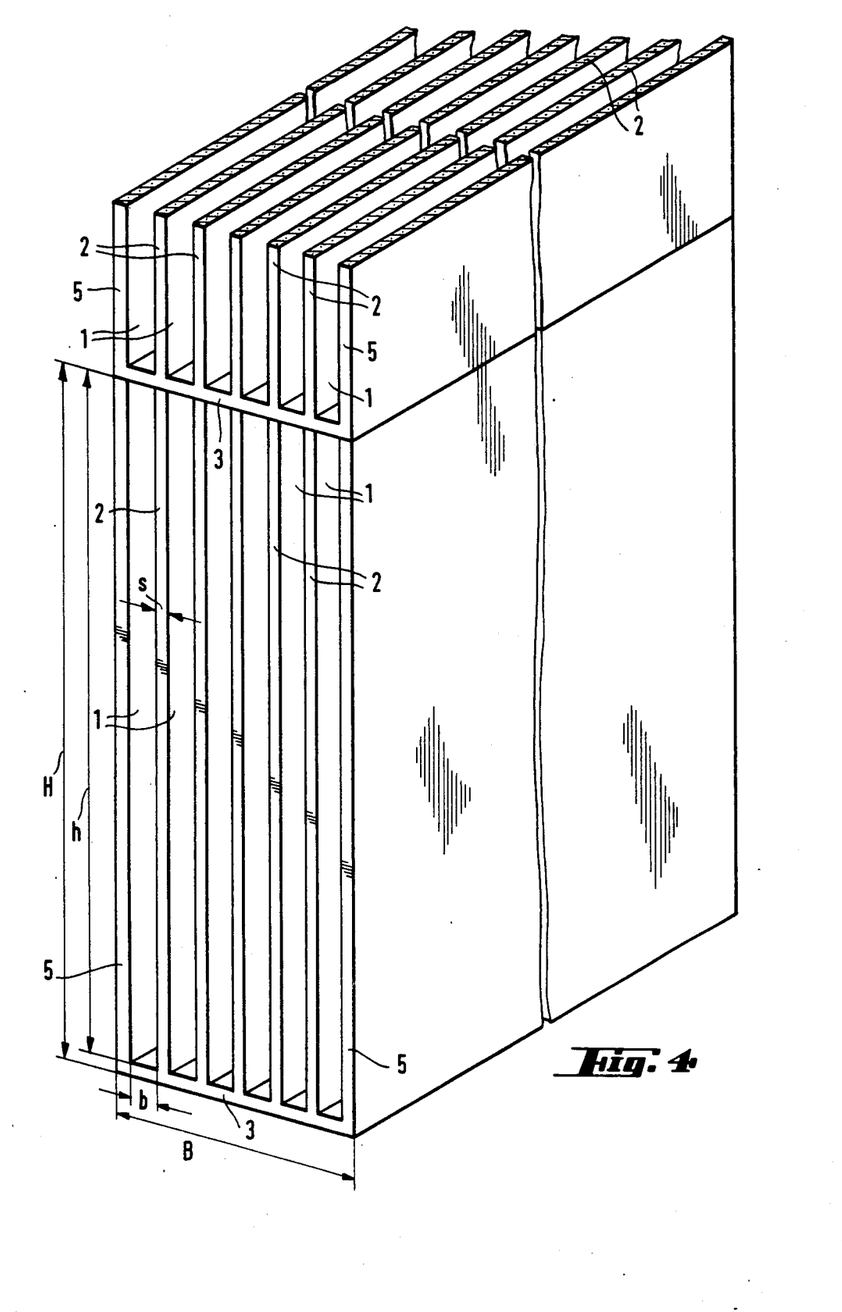
FIG. 4 is a perspective view of two catalyst blocks constructed according to the invention, stacked one on top of the other, and each having a comb-like cross section and vertical slots.

In the embodiment illustrated in FIG. 4, top wall 4 is missing. The block, therefore, has a comb-like profile. The slot width b is preferably between about 2 mm and about 50 mm.

Figure 5:
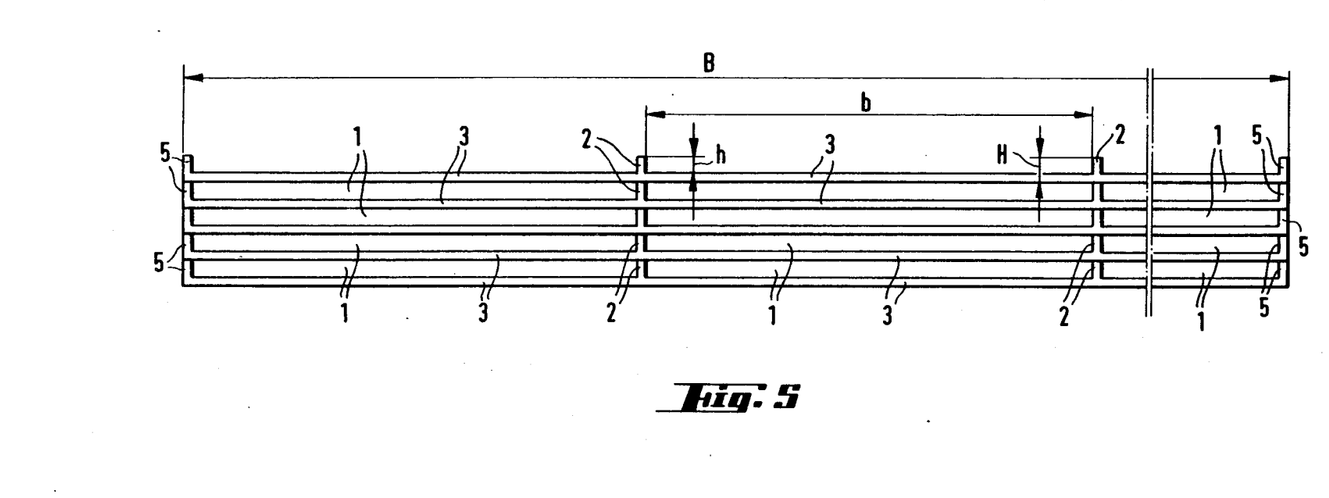
FIG. 5 is a perspective view of two catalyst blocks constructed according to the invention, stacked one on top of the other, and each having horizontal slots.

In the embodiment illustrated in FIG. 5, the blocks are also missing top wall 4. Here, slot width b is significantly greater than slot height h, which height, in this embodiment, is equal to the height H of the block minus the thickness of the wall 3. The slot height h here is between about 2 mm and about 50 mm, corresponding to the slot width b of the embodiment of FIG. 4. The slot width b of the embodiment illustrated in FIG. 5 is significantly greater. It is on the order of magnitude of the slot height h of the embodiment illustrated in FIGS. 1 and 4, that is, approximately 150 mm.

The blocks of the embodiments illustrated in FIGS. 4 and 5 which have comb-like cross sections can easily be stacked on top of one another, whereby bottom wall 3 of the upper block then forms the top wall for the lower block. The blocks illustrated in FIGS. 4 and 5 can preferably be manufactured by an extrusion process or by dry-molding. It is also conceivable that a casting process could be used to manufacture the blocks. In this case, it is advantageous if slots 1 on the individual block are open on one longitudinal side.

Figure 6:
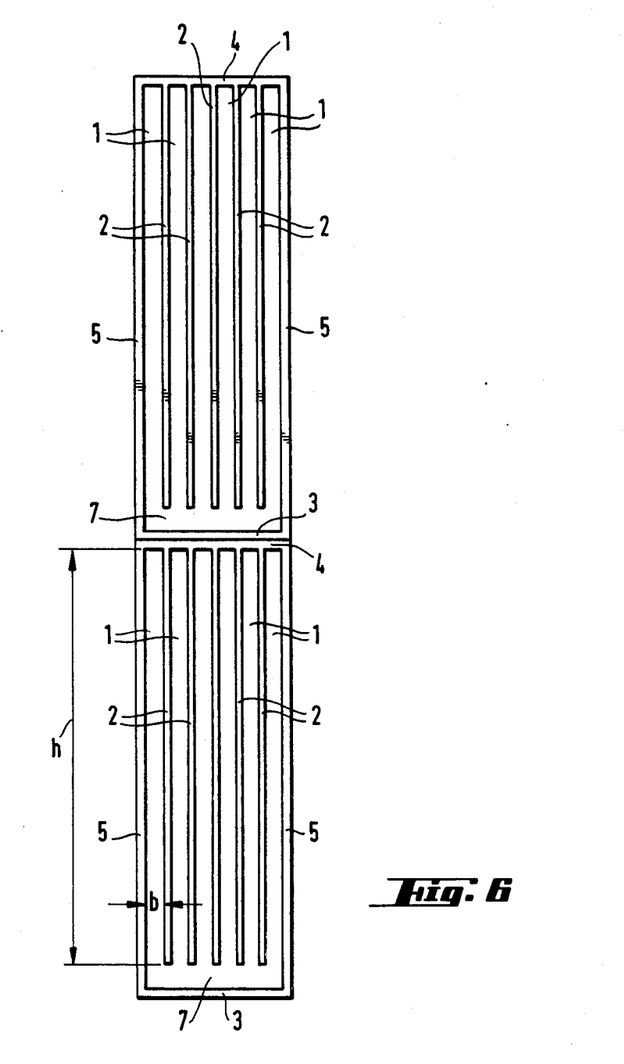
FIG. 6 is a perspective view of two comb-like catalyst blocks constructed according to the invention, stacked one on top of the other, and each having shortened slot walls.

In the embodiment illustrated in FIG. 6, the blocks are constructed exactly as in the embodiment illustrated in FIG. 4, with the exception that partitions 2 separating slots 1 are shorter than side walls 5. Thus, when the blocks are placed on top of one another, a collecting chamber 7 is formed, extending over slots 1. In the collecting chamber 7, the solid components of a dusty exhaust gas can be collected.

The catalyst blocks of the present invention can be used, for example, in reactors in which the $NO_x$ content of an exhaust gas is to be reduced. Even exhaust gases containing a great deal of dust, e.g., from coal combustion, can be treated.

Ser. No. 768,417, now U.S. Pat. No. 4,656,148 discloses that a suitable primary material for the catalyst is a naturally-occurring ferrous ore chosen from the group consisting of magnetite, hematite, siderite, chromium ore or iron pyrite. Modifications of these ores can also be used. There should be a total of at least 3% of the transition elements with the lowest stable oxidation stage. The at least 3% of transition elements is preferably by weight. The effective total is thereby the percentage sum of $Fe^{2+}$, $Cr^{3+}$, $Ti^{4+}$ and other transition elements. Especially transition elements in the IVB group, Titanium, Zirconium and Hafnium, are applicable to the teachings of the invention. Additional transition elements may be Nickel, Cobalt and Manganese, as well as others well known in the prior art. For example, the ores with their principal compositions indicated in the following table are suitable.

| | Sydvarange Iron Ore Concentrate % | Urkutsk Manganese Ore Chromium Ore % | Lake Iron Ore Konrad Ore % |
|---|---|---|---|
| Fe | 65.51 | 10.00 | 32.22 |
| $Fe^{2+}$ | 21.50 | unknown | 3.83 |
| Mn | 0.13 | unknown | 0.24 |
| P | 0.01 | unknown | 0.36 |
| $SiO_2$ | 7.73 | 5.00 | 14.52 |
| $Al_2O_3$ | 0.55 | 11.80 | 5.30 |
| CaO | 0.10 | 0.58 | 12.52 |
| MgO | 0.68 | 16.50 | 3.83 |
| $Cr_2O_3$ | — | 49.60 | — |

Intermediate products of pig iron production can also be used for the catalyst. These include sinter and iron ore pellets, which also exhibit an effective total of more than 3% of the transition elements. For example, the following values were determined in a sinter analysis:

Fe=60%, of which $Fe^{2+}$=11.15%, Mn=0.21%, $SiO_2$=6.60%, $Al_2O_3$=2.17%, CaO=4.75%, MgO=1.44%, P=0.08%.

Waste products from steel production can also be used as raw material for the catalyst. For example, the following slags, with essentially the composition indicated in the following table, can also be used:

| | LDAG Slag % | Bessemer Slag % | LD Slag % |
|---|---|---|---|
| Fe | 23.60 | 14.02 | 23.40 |
| $Fe^{2+}$ | 14.63 | 6.00 | 9.03 |
| Mn | 3.28 | 2.56 | 3.60 |
| $P_2O_5$ | 5.78 | 15.42 | 3.46 |
| CaO | 40.10 | 48.85 | unknown |
| MgO | unknown | 1.14 | unknown |

An example of an LD converter is found in U.S. Pat. No. 4,398,948, entitled "Methods For Controlling Blowing, Controlling The Slag Formation And Predicting Slopping In the Blowing Of Molten Pig Iron In LD Converter". An example of LD slag is found in U.S. Pat. No. 4,165,233, entitled "Treating Molten Metallurgical Slag". Both of the above-cited patents are incorporated herein by reference.

A red mud can also be used to manufacture the catalyst, in the form in which it is obtained, in the production of aluminum. Such a red mud may have the following composition:

| | |
|---|---|
| $SiO_2$ | 11.10% |
| $Al_2O_3$ | 33.50% |
| $TiO_2$ | 14.40% |
| $Fe_2O_3$ | 37.50% |
| CaO | 1.50% |
| $ZrO_2$ | 0.46% |

In addition, a recycling product can also be used as the primary material for the catalyst, if it exhibits a sufficiently effective total of appropriate transition elements.

Some examples of catalytic technology are found in U.S. Pat. Nos. 4,259,312, entitled "Process And Apparatus For Catalytically Reacting A Reducing Gas And Water Vapor"; 4,235,604, entitled "Method For Processing Coke Oven Gas"; and 4,049,777, entitled "Method Of Waste Gas Treatment", all of which are assigned to at least one of the same assignees as the instant application.

Further examples of catalytic technology are found in U.S. Pat. No. 4,448,895, entitled "Process For Preparation Of Catalyst For Cleaning Exhaust Gases And Catalyst Prepared For The Process", and 4,503,162, entitled "Catalyst Systems For The Conversion Of Gases". All of the above-cited patents are incorporated herein by reference.

The disclosure from Ser. No. 768,508, now U.S. Pat. No. 4,672,052 comprises bricks produced from an initial substance with approximately the following composition:

TABLE A

| 88.7% of $Fe_2O_3$ | Iron Oxide |
|---|---|
| 3.2% of $Fe_3O_4$ | Iron Oxide |
| 0.11% of MnO | Manganese Oxide |
| 0.02% of CaO | Calcium Oxide |
| 4.5% of $SiO_2$ | Silicon Dioxide |
| 1.17% of $Al_2O_3$ | Aluminum Oxide |
| 0.01% of MgO | Magnesium Oxide |
| 0.04% of $TiO_2$ | Titanium Dioxide |
| 0.007% of $V_2O_5$ | Vanadium Oxide |
| 0.16% of $P_2O_5$ | Phosphorus Oxide |
| and traces of As | Arsenic |
| Pb | Lead |
| Cu | Copper |
| Cr | Chromium |

This substance gives the following reduction rate in percentages for stoichiometric ratios of the nitrogen oxide and ammonia at the following temperatures:

| Temperature | Reduction Rate |
|---|---|
| 300° C. | 93% |
| 360° C. | 97% |
| 390° C. | 94% |
| 400° C. | 95% | whereby the reduction rate is computed from the difference in the input and output oxides of nitrogen content, in relation to the oxides of nitrogen content on the input side.

It has been a surprising discovery that this substance, as described in Table A, which is in itself a mixture of ordinary catalyst substances, causes a substantial acceleration of the reaction of oxides of nitrogen.

A second substance with approximately the following composition was used to produce the bricks:

TABLE B

| 46% of $Cr_2O_3$ | Chromium Oxide |
|---|---|
| 28% of $Fe_2O_3$ | Iron Oxide |
| 15% of $Al_2O_3$ | Aluminum Oxide |
| 10% of MgO | Magnesium Oxide |
| 1% of $SiO_2$ | Silicon Dioxide |

With a stoichiometric ratio of the nitrogen oxide and the ammonia, the following reduction rates in percentages were obtained at the following temperatures:

| Temperature | Reduction Rate |
|---|---|
| 250° C. | 95% |
| 300° C. | 98% |
| 350° C. | 99% |
| 400° C. | 95% |

Both the above substances were mixed together, depending on the application, to produce the bricks. Different mixtures of the two substances were prepared which exhibited the following reduction rates, in percentages, in relation to the characteristic following proportions of chromium oxide at the following temperatures:

| | Temperature | | | | |
|---|---|---|---|---|---|
| % of $Cr_2O_3$ | 250° C. | 300° C. | 350° C. | 400° C. | 450° C. |
| 10 | 72% | 95% | 98% | 97% | 95% |
| 5 | 65% | 93% | 97% | 98% | 98% |
| 1 | 55% | 82% | 93% | 98% | 98% |

For brown coal combustion, in which exhaust gas temperatures between 250° C. and 350° C. occur after the gas is exhausted from the combustion chamber, depending on the operating time of the furnace, the load case and design, a proportion of chromium oxide ($Cr_2O_3$) is selected in the mixture to be between 5 percent by weight and 20 percent by weight.

For melting chamber firings, for ballast bituminous coal which is burned at high temperatures, the exhaust temperatures, depending on the operating time of the furnace, the load case and the design, are typically approximately 350° C. to 450° C. The chromium oxide portion is for this case then set to less than 1 percent by weight.

Dry firings for high-value coal generally have exhaust temperatures in the range of 320° C. to 420° C. In this case, a mixture of both substances, from Table A and Table B, is used, in which there is a chromium oxide proportion of between 1 percent by weight and 5 percent by weight.

The mixture of the two above-mentioned substances contains relatively little $Al_2O_3$, but more $SiO_2$. That means that the $AL_2O_3$ exhibits only a slight tendency toward sulfate formation under the influence of sulfur trioxide. The $SiO_2$ with acid bonding contributes to a solid support structure for the bricks. It can be shown that specifically acid bonds of the mixture of substances make possible the formation of especially porous and solid bricks. Thin-walled, robust bricks can thereby be manufactured simply and economically. The production can take place, for example, by casting with a subsequent tempering or, with the addition of an auxiliary agent, by extrusion with subsequent tempering.

With the various combustions, depending on the coal charge, dusts occur with different compositions. Depending on the different composition of the dusts and their differing physical consistency, the tempering temperatures are between 300° C. and 600° C., and acids are added to produce the catalyst. Suitable acids are $H_2SO_4$, $HNO_3$, $H_3PO_4$, HCl, HF or similar acids. These also immunize the catalyst against poisoning.

In stripping installations, an acidity of approximately 20% is selected. For brown coal, an acidity of 6% has proven favorable. For bituminous coal, an acidity of approximately 4% is preferably selected. For ballast coal, operations are conducted with an acidity of 2%. For dry combustion for high-value coal, the acidity can be lower than any of the aforementioned percentages.

The various dusts differ in their grain size distribution, among other things. Thus, for example, for dusts from the above-mentioned melting chamber combustion, the average grain diameter is between 18 and 20 microns (1 micron=1 micro meter which is equal to $10^{-6}$ meters). The smallest grain sizes are as low as 1 micron. The grain spectrum ends at 90 microns with no grains to be expected above the size. To prevent dust of the average grain diameter from clogging up the macropores of the catalyst, the average pore diameter of the catalyst is designed so that it is smaller than the average grain diameter of the dust. Preferably, the average macropore diameter of the catalyst is between one fourth and three fourths of the average grain diameter of the dust. It has been shown to be favorable when the average macropore diameter of the catalyst is approximately half as large as the average grain diameter. In the example described above, the average macropore diameter of the catalyst is approximately 10 microns. That means that dust particles which are just a bit larger accumulate over the pores and prevent the penetration of the finest dust particles into the pores by filtering. If a thick filter layer has accumulated, then it is eroded away by the dust flowing through the catalyst. That prevents the fine dust particles from penetrating densely and tightly into the macropores of the catalyst, from which they could only be removed at the expense of a very severe erosion of the catalyst.

If the large-grain fraction of the dust is not sufficient to loosen the filter layer, the coarse portion of the dust can be artificially increased. This can be done, for example, by omitting the fine-grinding or by a controlled addition of coarse-grained material. Such coarse-grained material, for example, sand or coarse-grain fractions of available fines, which can be extracted from the electrostatic filter, is preferably added to the gases after the combustion chamber, but ahead of the catalyst.

The catalyst brick produced from the above-mentioned substances takes the form of a checker brick 1, the length, width and height of which are preferably always between 10 centimeters and 50 centimeters.

The catalyst, as taught by Ser. No. 831,142, now U.S. Pat. No. 4,695,559, retains an extraordinarily good control action, in addition to its known high activity and selectivity. Its possible applications, moreover, are very economical. The good control action is specifically determined by the relatively high sorption capability for ammonia, so that even with significant nitrogen oxide fluctuations in the waste gas to be purified, the danger of ammonia being channeled into the gas can be prevented, which would otherwise lead to problems in the downstream equipment. Because of the low oxidation capability of the catalyst described by the invention, there is no further oxidation of the sulfur dioxide, ammonia, or similar substances found in the gas to be purified. The sulfur trioxide, which occurs when sulfur dioxide is further oxidized, would otherwise be converted to sulfates with the ammonia in the waste gas stream. The oxidation of the ammonia added for the reduction to water and nitrogen, which does not take place because of the low oxidation capability of the catalyst, reduces the consumption of operating materials, so that with a purification process operated according to the invention, more economical operation can be achieved.

For most applications of the catalyst, in a special embodiment of the invention, it is particularly advantageous if the sorption capability for ammonia is high enough so that in a temperature range of between approximately 280° C. and 450° C., and in spite of nitrogen oxide fluctuations of up to 200 milligrams per cubic meter and essentially constant ammonia feed, no ammonia is channeled into the waste gas.

In another configuration, it is advantageous if the activity and selectivity regarding the nitrogen oxide conversion are essentially constant in the temperature range between 280° C. and 450° C. and the oxidation capability is negligible.

According to another feature of the Ser. No. 831,142, the catalyst is characterized by macropores between approximately 0.5 and 50 microns.

The characteristics of Ser. No. 831,142, now U.S. Pat. No. 4,695,559, described above can be achieved, for example, by a mixture of substances, which exhibit the basic substances A and B, whereby the basic substance A comprises the following components:

89 to 92 percent by weight of $Fe_2O_3$;
3 to 4 percent by weight of $Fe_3O_4$;
4 to 5 percent by weight of $SiO_2$;
1 to 2 percent by weight of $Al_2O_3$;
0.01 to 0.2 percent by weight of $MnO$;
0.01 to 0.03 percent by weight of $CaO$;
0.01 to 0.02 percent by weight of $MgO$; and
0.7 to 0.001 percent by weight of $V_2O_5$, and the basic substance B comprises the following components:

30 to 48 percent by weight of $Cr_2O_3$;
12 to 30 percent by weight of $Fe_2O_3$;
10 to 30 percent by weight of $Al_2O_3$;
10 to 25 percent by weight of $MgO$; and
1 to 5 percent by weight of $SiO_2$.

Surprisingly, such mixtures of substances have high activity and selectivity for nitrogen oxide conversion, high sorption capability for ammonia and low oxidation capacity for sulfur dioxide and ammonia, especially in the temperature range of between approximately 350° C. and 450° C. This is all the more surprising, since the known catalysts which contain $Fe_2O_3/Cr_2O_3$, of course, have relatively high activity and selectivity, as do combinations of $V_2O_5$ and $TiO_2$ in mixtures with $WO_3$. But there sorption capability with regard to ammonia is low, so that there is a poor control characteristic in the presence of severe and spontaneous nitrogen oxide fluctuations. The characteristics of the mixture of basic substances A and B are, therefore, surprising, because mixtures of $V_2O_5$ and $TiO_2$ already exhibit a significant oxidation-promotion effect in a temperature range from 350° C. to 450° C., which could only be limited by the addition of inhibitors, or else such a catalyst could not be used for gases containing sulfur. In the temperature range from 280° C. to 350° C., $V_2O_5/TiO_2$ catalysts exhibit relatively high activity and selectivity with regard to the nitrogen oxide conversion, as well as a low tendency to oxidation. They also exhibit a low sorption capability with regard to ammonia, so that their control characteristic is poor. $Fe_2O_3/Cr_2O_3$ mixtures exhibit a high sorption capability at temperatures from 280° C. to 350° C., which results in a good control behavior, but their activity is low.

Furthermore, it has been shown that, surprisingly, the activity of the mixture of substances can be significantly increased by sulfatization.

The same is true for a temperature range from 280° C. to 350° C., if the $V_2O_5$ is finely divided in the mixture.

According to one feature of the process described by the invention, sufficient strength and water-resistance can be imparted to the dry mixture of substances of the catalyst if it is present in a grain size of less than 0.2 mm and bonded with a phosphate acid such as phosphoric acid.

The activation of the catalyst is carried out according to another characteristic feature, preferably by means of sulfuric acid or VOSO$_4$ by saturation.

A heat treatment, that is, calcination, of the mixture of substances is preferably done at 200° C. to 500° C., whereby temperature increase rates of preferably between about 500° C. per minute and about 1° C. per minute are used.

It is also proposed that fiber material of glass and/or ceramic and/or carbon and/or steel be added to the mixture of substances, which fiber material is used as a support structure during the molding of the mixture of substances into moldings.

The molding of the mixture of substances is preferably done isostatically into smooth or corrugated plates.

It has thereby been shown to be particularly advantageous if a molding pressure of between about 0.1 and about 100 metric tons per square centimeter is used.

The substances are molded, preferably into plates with a thickness of approximately 0.5 to 5 mm, and preferably approximately 1 to 3 mm.

According to another embodiment of the invention, the size of the plates is set during molding to between approximately 1 and 10,000 square centimeters.

An advantageous application of a catalyst of Ser. No. 831,142 comprises its use in the form of plates or corrugated plates at specified intervals in integrated units or cassettes, for the creation of a free-passage catalyst unit. The cassettes can exhibit corrugated spacer plates to separate the catalyst, present in the form of plates. This configuration results in infinitely long slits. The cassettes are approximately combined to form complete reactors.

One problem encountered in the prior art is that the reduction agent is not completely consumed in the catalyst bed, and therefore a so-called "slip" arises, which can cause secondary reactions in the low temperature range of operation. What is meant by "slip" is that the reducing agent escapes from the first bed without fully reacting therein. In power plants, for example, in which fuels containing sulfur are used, the downstream heat exchangers can be adversely affected. It is also known that high conversion amounts can only be achieved with a high ammonia consumption. It therefore follows that with high conversion rates and/or conversion amounts, the ammonia slip also increases.

If, for example, we consider ammonia as the reduction agent, the reduction of the nitrogen oxides proceeds according to the following basic reactions:

Undesired secondary reactions, which are to be prevented, are:

If there is an excess of ammonia, and if there is sufficient oxygen in the gas, the following additional reactions take place:

If we proceed on the basis of this stoichiometry, then a portion of the ammonia is used for the reduction of the nitrogen oxide, and the rest is lost to oxidation, or emerges as "slip". Even large reservoirs or resources of catalyst do not eliminate this problem.

The invention as described hereinabove in the context of the preferred embodiments is not to be taken as limited to all of the provided details thereof, since modifications and variations thereof may be made without departing from the spirit and scope of the invention.

What is claimed is:

1. A catalyst block for effecting catalytic conversion reactions in an exhaust gas flowing therethrough, said catalyst block comprising:
an integrally formed block having a quadrangular cross section and provided with at least one row of a plurality of throughgoing slots separated by intermediate walls;
each of said throughgoing slots having a width dimension and a height dimension, one of said width and height dimensions being at least 25 times a multiple of the other of said width and height dimensions; and
at least one of said throughgoing slots having a catalytic surface.

2. The catalyst block according to claim 1, further comprising a first wall forming an outer surface of said block and bounding a first end of each of said plurality of slots.

3. The catalyst block according to claim 1, further comprising a top wall forming a first outer surface of said block and a bottom wall forming a second outer surface of said block, said top and bottom walls also bounding opposite ends of each of said plurality of slots such that each of said plurality of slots forms a discrete throughgoing passage in said block.

4. The catalyst block according to claim 2, wherein said first wall comprises a bottom wall of said block.

5. The catalyst block according to claim 2, wherein the height of said block is H, wherein the height of the slots is h, and wherein the slot height h plus the thickness of said first wall equals the height, H, of said block.

6. The catalyst block according to claim 3, wherein the height of said block is H, wherein the height of the slots is h, and wherein the slot height h plus the thickness of said top wall plus the thickness of said bottom wall equals the height, H, of said block.

7. The catalyst block according to claim 1, wherein said block has first and second side walls of height H forming exterior side surfaces of said block, and wherein the height of each of said intermediate walls is less than H, and further comprising a collecting chamber, for collecting dust from said exhaust gas, interconnecting at least two of said plurality of slots.

8. The catalyst block according to claim 2, wherein said block has first and second side walls of height H forming exterior side surfaces of said block, and wherein the height H of each of said intermediate walls is less than H, and further comprising a collecting chamber, for collecting dust from said exhaust gas, interconnecting at least two of said plurality of slots.

9. The catalyst block according to claim 3, wherein said block has first and second side walls of height H forming exterior side surfaces of said block, and wherein the height of each of said intermediate walls is less than H, and further comprising a collecting chamber, for collecting dust from said exhaust gas, interconnecting at least two of said plurality of slots.

10. The catalyst block according to claim 1, wherein said block is provided with a multiplicity of said slots, and wherein one of said height and width dimensions varies among said slots with said one dimension being less for slots located closer to the interior of said block than for slots located closer to the exterior of said block.

11. The catalyst block according to claim 2, wherein said block is provided with a multiplicity of said slots, and wherein one of said height and width dimensions varies among said slots with said one dimension being less for slots located closer to the interior of said block than for slots located closer to the exterior of said block.

12. The catalyst block according to claim 3, wherein said block is provided with a multiplicity of said slots, and wherein one of said height and width dimensions varies among said slots with said one dimension being less for slots located closer to the interior of said block than for slots located closer to the exterior of said block.

13. The catalyst block according to claim 10, wherein said one dimension is the width b of each of said multiplicity of slots.

14. The catalyst block according to claim 11, wherein said one dimension is the width b of each of said multiplicity of slots.

15. The catalyst block according to claim 12, wherein said one dimension is the width b of each of said multiplicity of slots.

16. The catalyst block according to claim 1, further comprising a transverse web disposed in at least one of said plurality of slots.

17. The catalyst block according to claim 2, further comprising a transverse web disposed in at least one of said plurality of slots.

18. The catalyst block according to claim 3, further comprising a transverse web disposed in at least one of said plurality of slots.

19. A catalyst block for effecting catalytic conversion reactions in an exhaust gas flowing therethrough, said exhaust gas having a dust content in a given range, said catalyst block comprising:
  an integrally formed block having a quadrangular cross section and provided with at least one row of a plurality of throughgoing slots separated by intermediate walls;
  each of said throughgoing slots having a width dimension and a height dimension, one of said width and height dimensions being at least 25 times a multiple of the other of said width and height dimensions;
  at least one of said throughgoing slots having a catalytic surface; and
  said slots having a length in the direction of flow of said exhaust gas such that a substantial portion of said dust content of said exhaust gas settles out of said exhaust gas during transport through said catalyst block.

20. The catalyst block according to claim 1, wherein said integrally formed block is formed by an extrusion process.

21. The catalyst block according to claim 1, wherein said integrally formed block is formed by a dry-molding process.

22. The catalyst block according to claim 19, wherein said integrally formed block is formed by an extrusion process.

* * * * *